May 7, 1929.  E. L. RELLER ET AL  1,712,356
ACCOUNTING APPARATUS
Filed Nov. 4, 1919   7 Sheets-Sheet 1
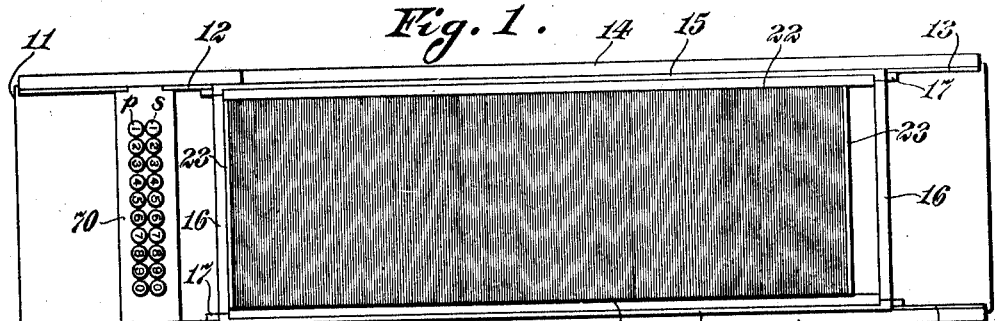
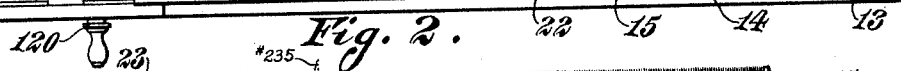
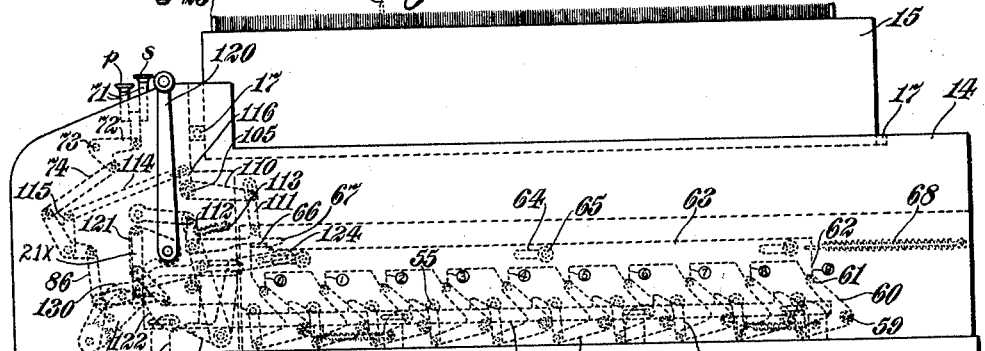
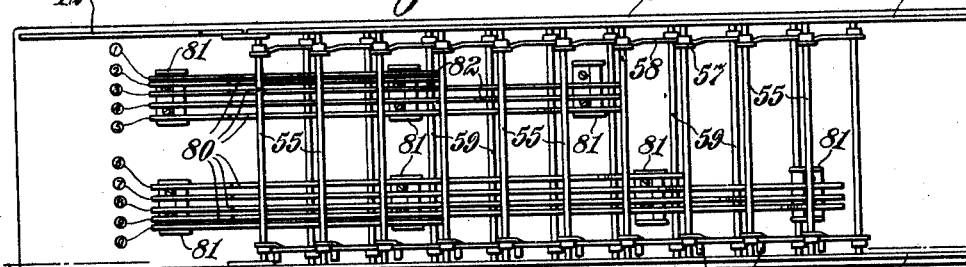
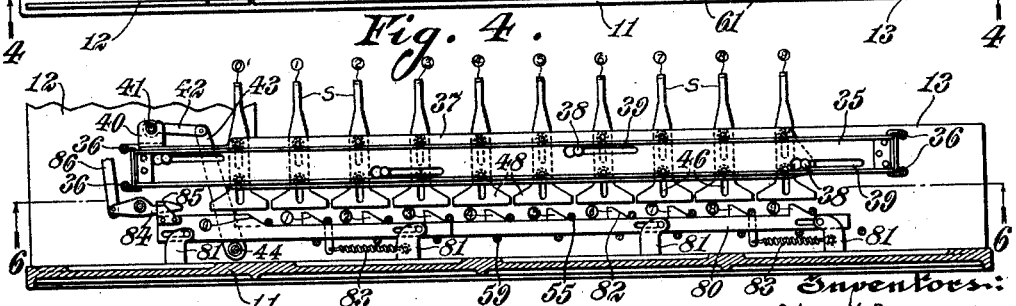
Inventors:
EDWIN L. RELLER, AND JOHN H. BRUNINGA,
By John H. Bruninga
Their Attorney

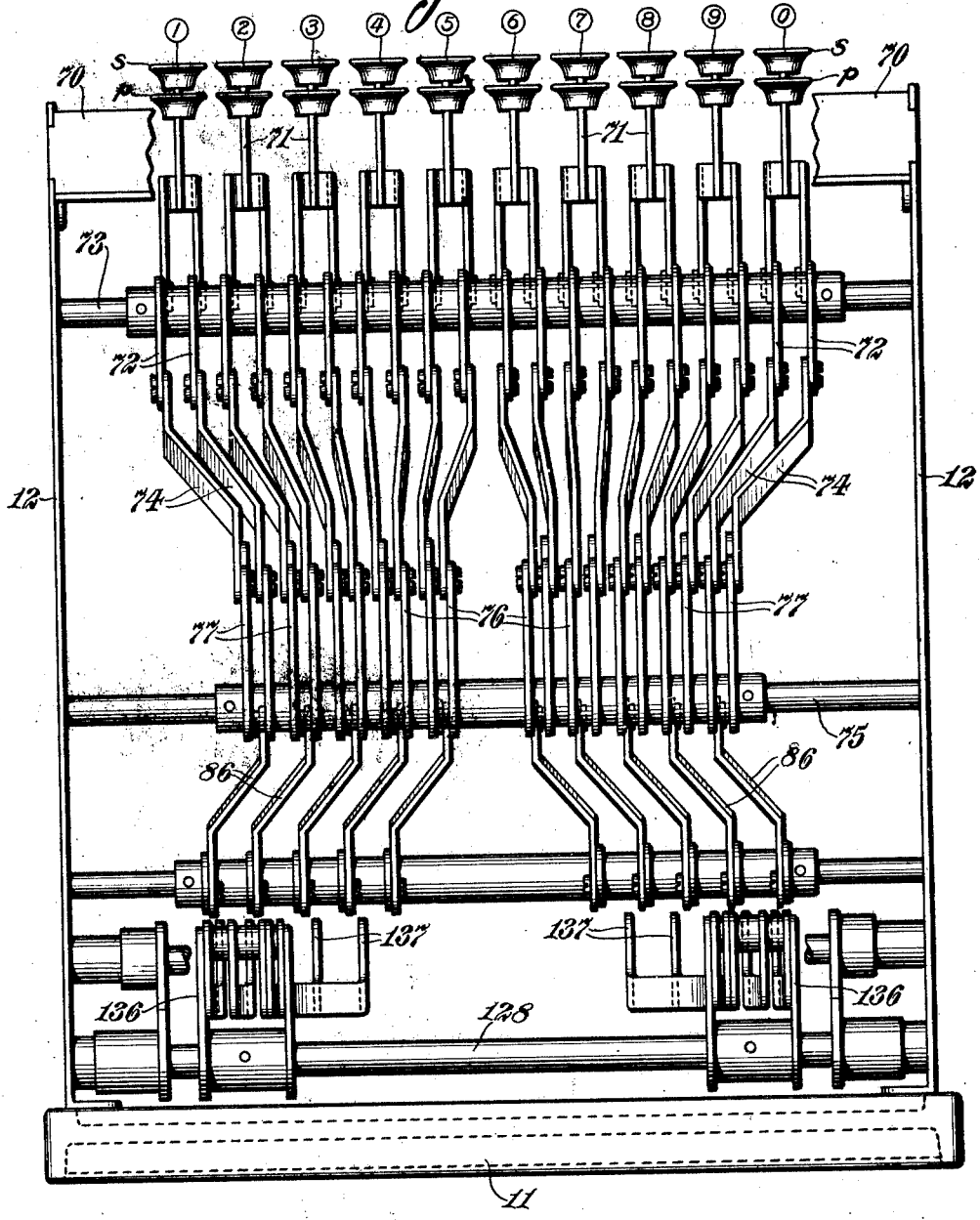

May 7, 1929.  E. L. RELLER ET AL  1,712,356
ACCOUNTING APPARATUS
Filed Nov. 4, 1919  7 Sheets-Sheet 5

Inventors:
Edwin L. Reller, & John H. Bruninga,
By John H. Bruninga,
Their Attorney.

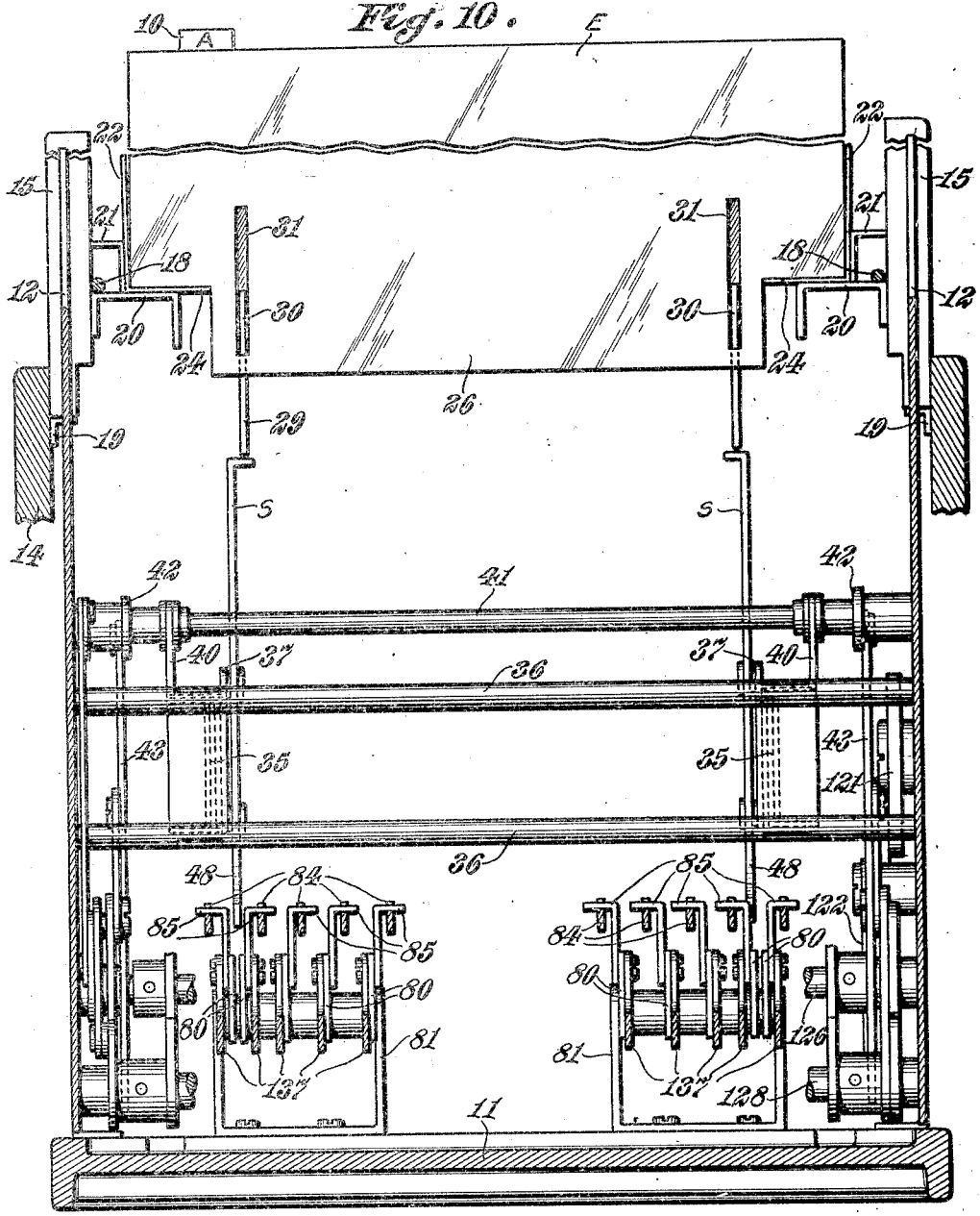

May 7, 1929.  E. L. RELLER ET AL  1,712,356
ACCOUNTING APPARATUS
Filed Nov. 4, 1919  7 Sheets-Sheet 7
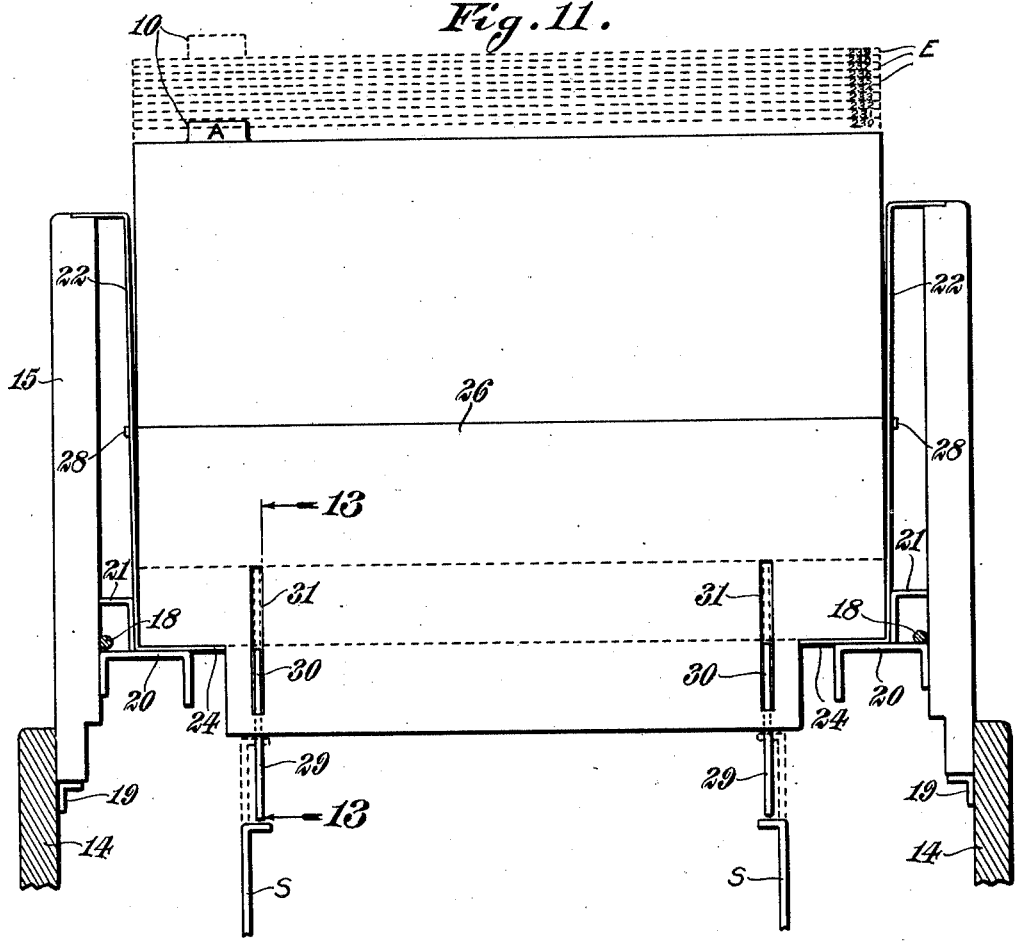
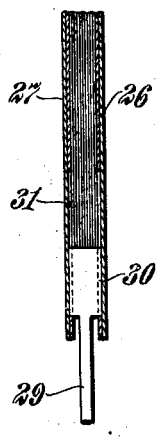
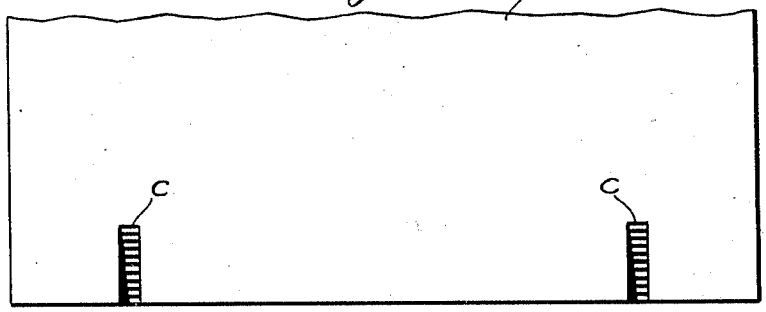
Inventors:
EDWIN L. RELLER, and JOHN H. BRUNINGA,
By John H. Bruninga,
Their Attorney.

Patented May 7, 1929.

1,712,356

UNITED STATES PATENT OFFICE.

EDWIN L. RELLER AND JOHN H. BRUNINGA, OF ST. LOUIS, MISSOURI, ASSIGNORS, BY MESNE ASSIGNMENTS, TO REMINGTON RAND INC., OF NEW YORK, N. Y., A CORPORATION OF DELAWARE.

ACCOUNTING APPARATUS.

Application filed November 4, 1919. Serial No. 335,704.

This invention relates to an apparatus and system for the finding of accounts.

In modern accounting systems, the accounts are kept on cards or sheets which are arranged in trays or ledgers, in order to facilitate the finding of such accounts, and these cards are arranged either alphabetically or numerically. Where, however, there are a larger number of accounts requiring a large number of cards, means must be provided to facilitate the finding of any particular account. Accordingly, there are usually provided index cards which locate and subdivide the account cards into units which are in turn arranged in groups and subdivisions. Such a system, when requiring manual finding, has many limitations; for, to find a given account the accountant must search through the different groups to find the group containing that account; then through that group to find the subdivision containing that account; and then through the cards of that subdivision to find the account containing the account desired. These operations not only require a good deal of time, but also require the handling and fingering of cards other than the desired card. Consequently the cards are subjected to unnecessary wear and soiling. Moreover, when a card is to be returned, the accountant must again find its proper place, which again requires considerable time and has the attendant disadvantages. The manual system also has the disadvantage of possibility of a card becoming lost and the large amount of time required to audit or check the given system.

One of the objects of this invention, therefore, is to provide an apparatus and system for finding accounts, which will overcome the objectionable features inherent in the manual system, and which will find the desired account mechanically.

Another object is to provide an apparatus and system, whereby an assembled unit of account cards containing the desired account is located from among the cards in a tray, and the cards of the located unit disaggregated.

Another object is to provide an apparatus and system, whereby the desired account is located by a series of eliminations, comprising the location of a group of cards containing the desired account, the location in that group of an assembled division containing the desired account, and the disaggregation of the cards of the located division.

Another object is to provide an accounting system in which the cards of an assembled unit of account cards have selective characteristics adapted for cooperation with selecting means, whereby the cards of the unit may be disaggregated.

Further objects will appear from the detail description taken in connection with the accompanying drawings in which:

Figure 1 is a plan of an apparatus embodying this invention;

Figure 2 is a side elevation;

Figure 3 is a plan showing the mechanism employed for the location of a group of account cards, the selectors being omitted;

Figure 4 is a section on the line 4—4, Figure 3, but showing also the selectors and their carrier;

Figure 5 is an end view of the machine showing the keys and their connections;

Figure 10 is a section on the line 10—10, Figure 8;

Figure 11 is a view somewhat similar to Figure 10, but illustrating the operation;

Figure 12 is a view of an assembled unit of cards; and

Figure 13 is a section on the line 13—13, Figure 11.

Figure 6:
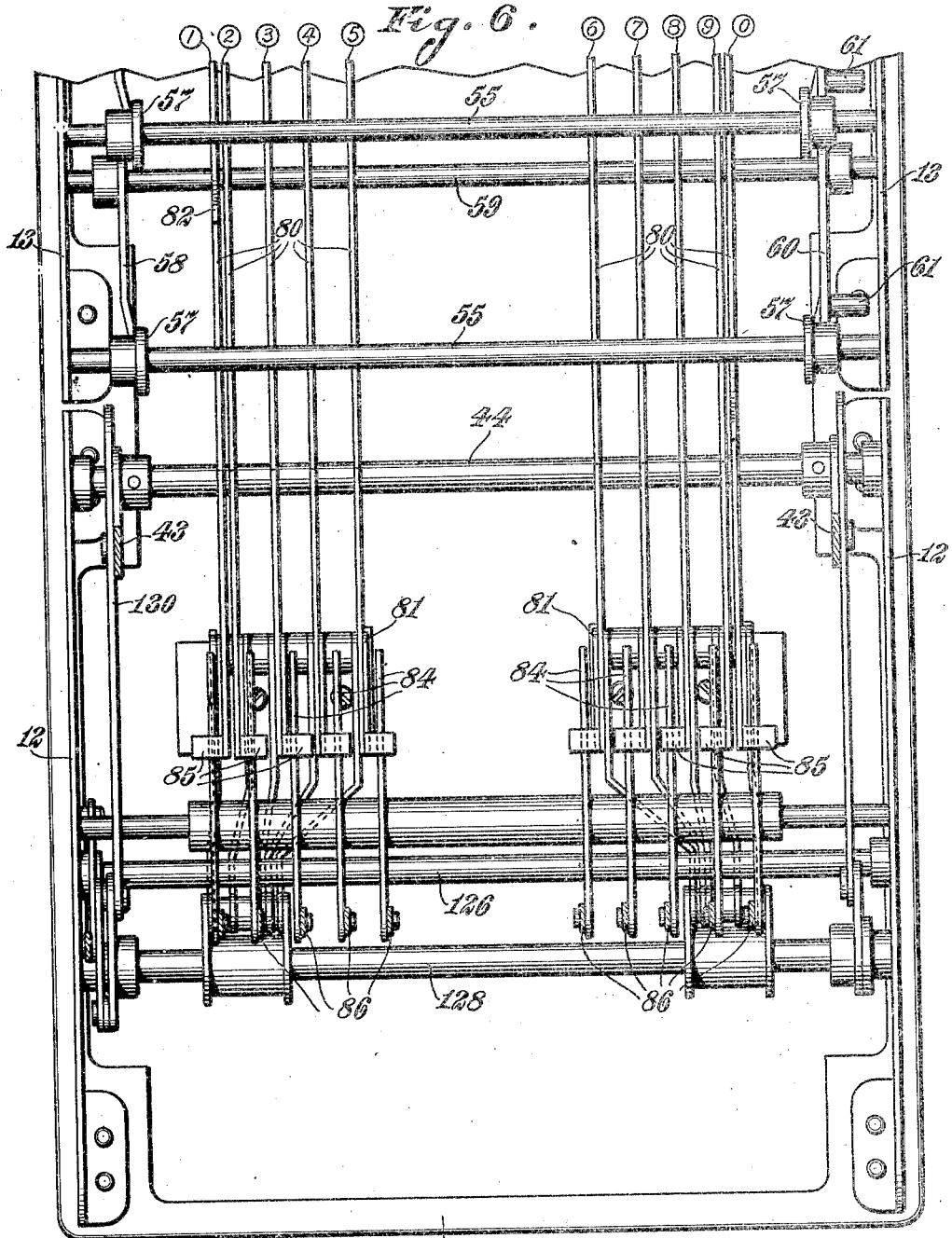
Figure 6 is a section on the line 6—6, Figure 4, showing the effectual bars and their connections.

In many of the views, parts have been omitted; this has been done to promote clearness, for if all of the parts behind the plane at which a view is taken were shown, they would obscure the particular mechanism under consideration.

In the specification and claims, the term "card" is used in its broadest sense so as to include ordinary cards, loose leaves, sheets or other accounting elements used in the keeping of accounts. The term "tray" is also used in its broadest sense so as to include holders, etc., adapted for holding cards, etc.

The frame or body.

Referring to Figures 1 to 4 inclusive and Figure 10, the main frame of the machine comprises a base 11, a pair of side plates or standards 12, and a pair of side plates or standards 13 connected by cross-pieces to from a braced skeleton structure. The side plates may be faced with panels 14 of wood or any other suitable material.

Mounted on the main frame is a tray support comprising a pair of sides 15 and ends 16 connected by rods 18 and mounted on the main frame and inside of the panels 14. The panels have supporting ledges 19 and positioning brackets 17 engaging the sides and end of the tray support to accurately position and maintain the cards and the plungers in the tray in correct cooperative relation with respect to the selecting means supported in the main frame as hereinafter described, reference in this connection directed to British Patent No. 153,344, Nov. 3, 1920.

The tray and cards.

Referring to Figures 1 to 4 inclusive and 10 to 13 inclusive, the sides 15 of the tray support have attached thereto and extending therealong, brackets 20 and side members 21. Mounted on the brackets 20 and between the side members 21 is a tray for receiving the cards. This tray is preferably constructed of sheet metal and comprises sides 22 and ends 23; the sides extend inwardly at the bottom as shown at 24, to form supporting legs for the cards and flare outwardly to permit ready insertion of the cards.

The sides 22 of the tray carry a series of pairs of slightly separated guide-plates 26, each pair supporting therebetween a partition 27 which is free above the supporting plates 26, the supporting plates being secured in the sides by lugs 28 on the plates engaging recesses in the sides 22.

Arranged between adjacent supporting plates 26 are plungers 29, each of which has laterally extending wings 30 engaging slots 31 in the supporting plates. There are a pair of plungers in each compartment formed by two adjacent pairs of supporting plates and partitions, and each compartment is adapted to accommodate a unit of cards as hereinafter described.

In this embodiment, a tray is adapted to receive one thousand cards in one hundred divisions or units of ten account cards each. Accordingly, there are one hundred compartments. A tab 10 (Figure 11) may be formed directly on the partition 27 to identify a compartment.

Referring to Figures 11 to 13 inclusive, a unit of assembled cards comprises in this particular embodiment, ten cards E, each of which is of a length equal to the length of the compartment and of a height so as to be substantially flush with or project slightly beyond the partitions. Each card is provided with selective characteristics adapted for cooperation with the selectors, as hereinafter described, through the medium of the plungers arranged in the compartments. It is to be understood, of course, that the number of cards in a compartment may be varied to suit requirements, but the number ten is particularly applicable to decimal systems. The selective characteristics of the different cards of the unit are differentiated and correspond respectively to the positions of the cards in that unit. In the embodiment shown, each card is provided with a pair of characteristics C, in this instance notches, the vertical depths or extents of which vary in the different cards, and it will be noted that these depths decrease from the front to the back of the unit so that the extent of each characteristic will define the position of the card in its unit. In this particular embodiment, there are a pair of characteristics spaced along the bottom edge of the card and these characteristics for a given card are duplicates for the purpose of preventing binding of the card. It will be noted by reference to Figure 12, that the plungers have considerable vertical movement, this vertical movement being somewhat in excess of the depth of the deepest characteristic.

Assuming a unit of cards to be placed in a compartment with the characteristics in alinement with a pair of plungers in the compartment, such plungers are adapted to be raised concurrently by selectors S as hereinafter described; when such a unit of cards rests in its compartment so that the lower edges are flush, then at this time, the upper edges will also be flush and the cards will be arranged wholly within the compartment. The characteristics will at this time occupy the positions shown in Figure 12, while the cards will be as shown in Figure 10.

When selectors S are concurrently moved from full to dotted positions, Figure 11, they will cooperate with the plungers to raise them also from full to dotted positions. These plungers will cooperate with the characteristics C on the cards of the unit and raise the cards above the partition. The cards of the unit will, however, be raised to different extents and inversely in accordance with the depths of the respective characteristics. Now since the depths of the characteristics decrease from the front to the back, the amount of vertical displacements given to the cards will increase from the front to the back. Accordingly, the cards will be displaced vertically in accordance with their positions in the unit so that the cards of the unit will be arranged in overlapping relation so as to expose all of the faces of the cards at their upper edges from front to back of a unit. Each of the cards is provided with an identifying inscription, such as the name or number of the account placed along its upper edge, so that the disaggregation of the cards will render all of the cards in the unit visible for inspection. Accordingly, any given account may be readily found and the card thereof may be withdrawn or replaced.

The selecting mechanism.

Referring to Figures 2, 4, 7, 8 and 10, arranged along the machine is a pair of supports 35 which are sustained by cross bars 36 connecting the plates 12 and 13 so as to fixedly maintain the supports 35. Mounted to slide on these supports 35 are a pair of side bars or carriers 37, each of which is provided with a pair of headed pins 38 engaging slots 39 in the supports. The carriers are thus arranged for limited movement along the machine. The forward ends of these carriers are provided with heads 40 which are connected with a cross-shaft 41, the ends of which engage longitudinal slots 410 or ways formed in the side plates 12. Links 42 connecting the ends of the shaft 41 with arms 43 mounted on a shaft 44 between the side plates, and springs 45 connecting the arms 43 with the side plates 13, tend to move the carriers to the right, Figures 4 and 8.

The side bars 37 form a selector carrier and are adapted to support ten pairs of selectors S. Each of these selectors has slots 46 engaging pins 47 on the carrier side bars so as to permit vertical movements of these selectors, and each selector is normally retained at the lower limit of its movement by a spring 480 connected at its upper end with a selector, and at its lower end to a lower guide pin 47. Each selector is provided at its lower end with a head 48, the lower face of which is extended for some distance, for a purpose hereinafter to be described.

It will, therefore, be seen that by movement of the selector carrier along the machine, a pair of selectors is arranged for cooperation with various pairs of plungers arranged along the machine. In accordance with this invention, however, and in order to eliminate extended movement of a pair of selectors along the full length of the machine, there are ten pairs of selectors provided, each one of which is designed for a group of ten pairs of plungers and ten compartments comprising a group.

The selector actuating mechanism.

Referring to Figures 2, 3, 4, 7 and 8, arranged for cooperation with the heads 48 of the selectors are a series of ten bars 55 moving in vertical slots 56 in the side plates 13. Each of these bars is connected by a pair of links 57 with arms 58 of a rock shaft 59. One of these arms 58 (see Figure 2) has formed thereon a second arm 60 so as to provide a bell-crank lever. This arm 60 has a laterally projecting pin 61 arranged to be moved into the path of a lug 62 on an actuator bar 63 mounted to slide on the right (Figure 7) side plate by a pin and slot connection 64, 65. There are a series of ten lugs 62, one for each bell-crank lever. The actuator bar 63 is provided with a laterally extending lug 66 engaged by a pawl 67. A spring 68 connecting the actuator bar 63 with the side plate 13 normally tends to move this bar to the right (Figure 2) but this bar is retained by the pawl 67.

Assuming one of the pins 61 to have been moved into the path of its corresponding lug 62 by means hereinafter described; if, at this time, the actuator bar is released, the lug will, by engagement with the pin 61, swing the bell-crank lever and raise the connected bar 55 so as to engage the head 48 and raise the corresponding pair of selectors S. It will, however, be noted on account of the extended bearing surface of the head 48, the cooperative relation between the selector and its actuator 55 is maintained in the different positions of the selector along the machine.

The key mechanism.

Figure 8:
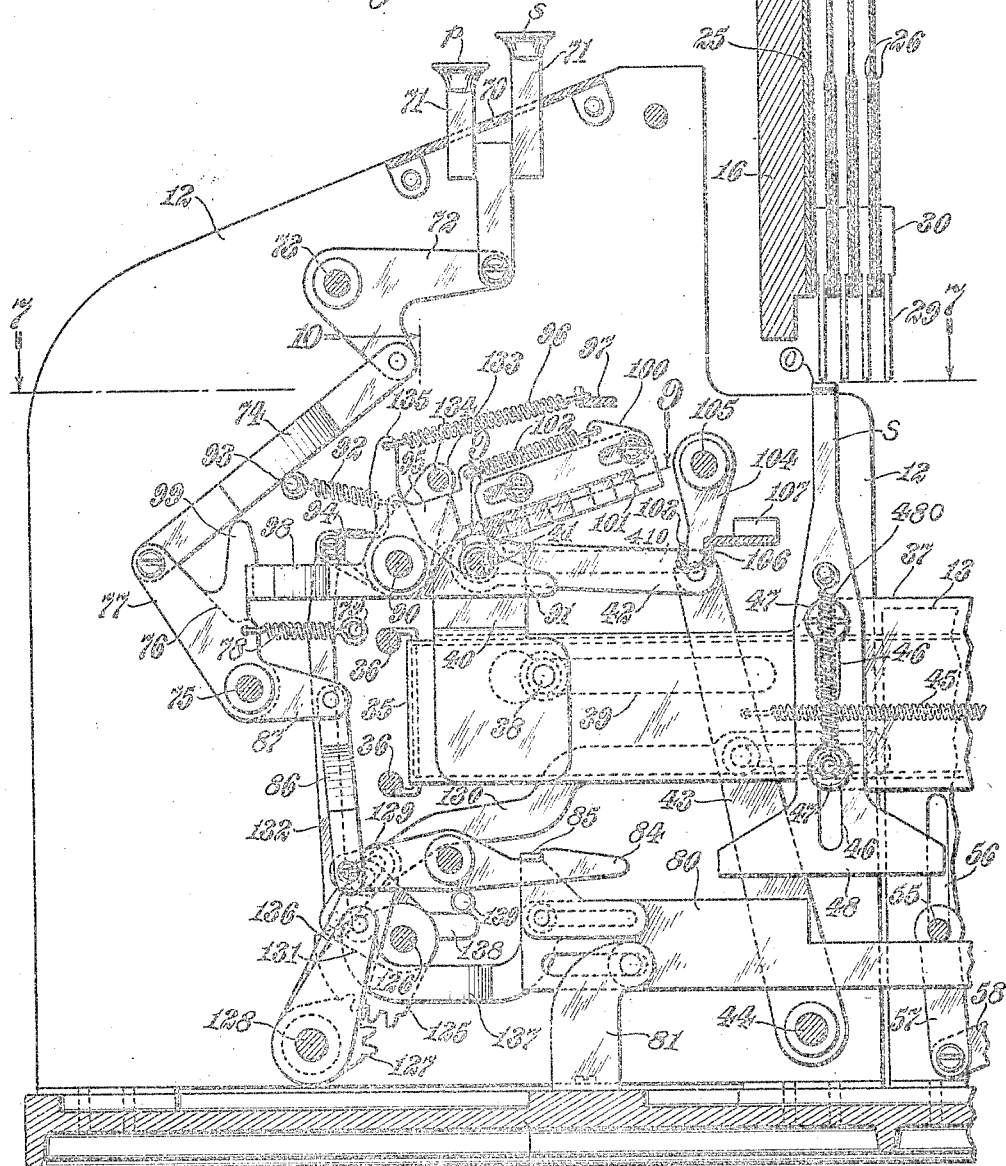
Figure 8 is a section on the line 8—8, Figure 7.

Referring to Figures 1, 2 and 8, the side plates 12 support a plate 70 which is slotted to receive the shanks 71 of the keys. These keys are arranged in two rows of ten keys each, which, for the decimal system, are numbered from "1" to "0" inclusive. Each key shank is connected with a bell-crank lever 72, there being two series of bell-crank levers of ten levers each loosely mounted on a shaft 73 connecting the side plates 12, one series corresponding to the primary row of keys $p$ and the other series corresponding to the secondary row of keys $s$. Each bell-crank lever 72 is connected by a link 74 with a corresponding lever on the shaft 75. There are two series of these levers, one series 76 corresponding to the primary keys $p$ and the other series 77 corresponding to the secondary keys $s$; accordingly, upon the depression of any primary key, the corresponding primary lever 76 will be actuated, while upon depression of any secondary key, a corresponding secondary lever 77 will be actuated. The levers are normally held in the position shown in Figure 8 by springs 78, each of which is connected at one end to the lever and at its other end to a cross-bar 79.

Primary selector location.

It has heretofore been pointed out that there are ten pairs of selectors provided for the hundred pairs of plungers and for the hundred compartments; accordingly, each pair of selectors is designed for a group of ten compartments. Since, however, only one pair of selectors is designed to be operated at one time, it is necessary to select the desired pair.

Now it will be noted that, as shown in Figures 2 and 8, in the normal position of the parts, the pins 61 will be out of cooperative relation with their corresponding actuator lugs 62, but that the actuator bars 55 are allowed limited movement before engaging the selectors. In accordance with this invention, therefore, location of a group of cards is primarily obtained by rendering effective for cooperation the proper pair of selectors.

Referring to Figures 2, 4, 5, 6 and 8, 80 designates a set of effectual bars mounted for sliding movement along the machine on brackets 81. There are ten of these bars and each is provided with a cam 82 adapted for cooperation with a corresponding actuator bar 55. A spring 83 for each bar tends to move the bar to the right, Figure 4, but each bar is normally retained against the tension of its spring by a latch 84 engaging the lug 85 on the bar. The latches 84 are connected by links 86 with arms 87 on the primary lever 76.

Upon the depression of any primary key $p$, the corresponding latch 84 will be actuated to release the corresponding effectual bar 80. This effectual bar will then cooperate with a corresponding actuator bar 55 raising it sufficiently so as to swing the connected bell-crank lever 58—60 and position its pin 61 in front of its corresponding actuator lug 62. Accordingly, when the actuator bar 63 is now released, as heretofore described, the bell-crank lever 58—60 will be swung still further so as to cause the actuator bar 55 to cooperate with the chosen selectors and raise them.

Secondary selector location.

In order to select a division of cards in a selected group as determined by the rendering effective of the proper selectors for that group, it is necessary to shift the selectors along the machine until these selectors are in proper cooperative relation with the desired division of the selected group.

Figure 7:
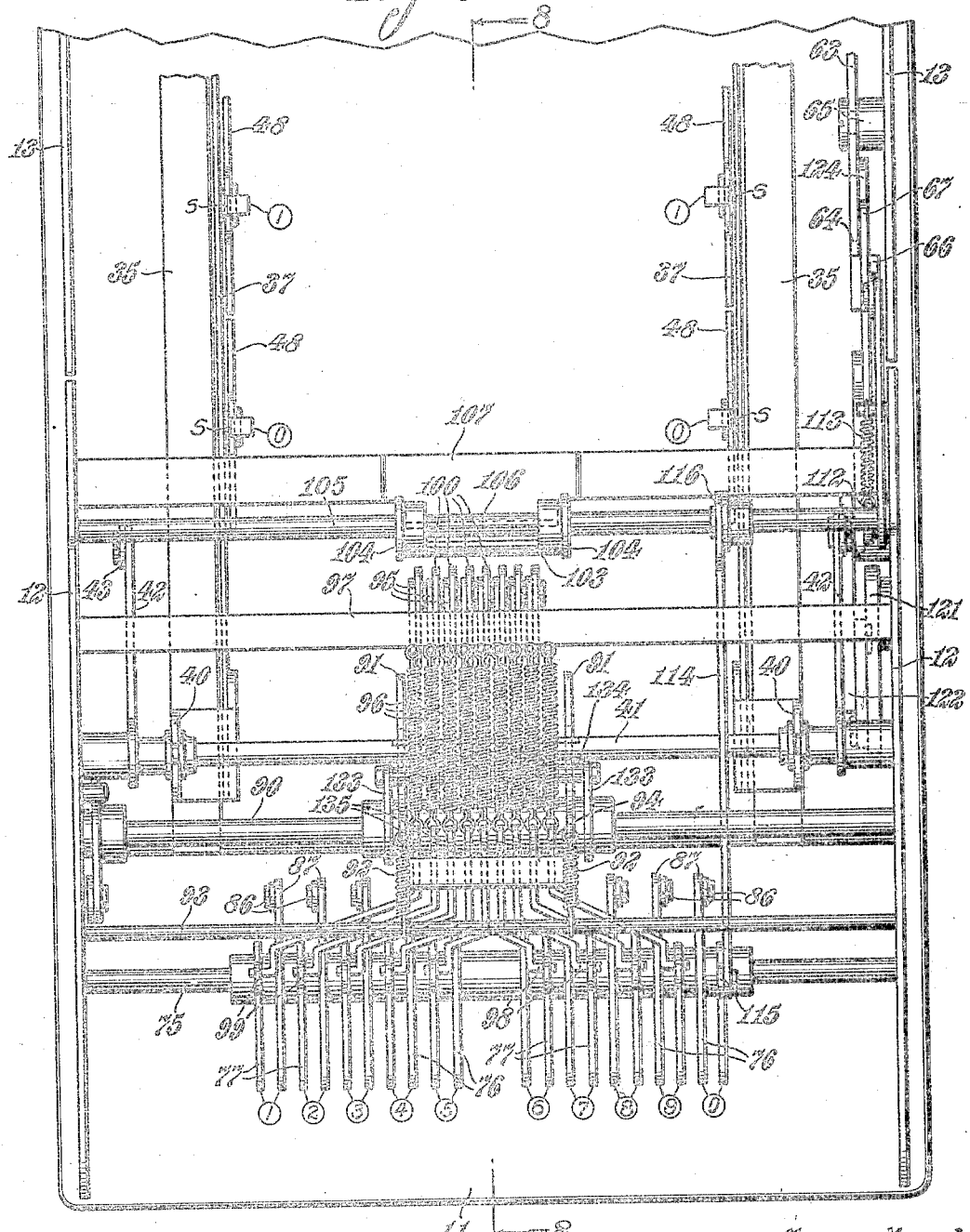
Figure 7 is a section on the line 7—7, Figure 8, showing the mechanism for locating the selectors, so as to locate a division of a selected group.
Figure 9:
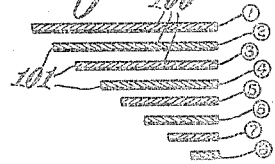
Figure 9 is a section on the line 9—9, Figure 8.

Referring to Figures 7, 8 and 9, mounted on a shaft 90 connecting the side plates 12 are a pair of latches 91 adapted to engage the cross bar or shaft 41. These latches are retained in engaging position by springs 92 connected with a cross-bar 93 between the side plates 12 and these latches are further connected at their rear ends by a cross bar 94.

Loosely mounted on the shaft 90 are a series of arms 95 each of which is connected by a spring 96 with a cross-piece 97 connecting the side plates 12, and each of which has an extension 98 engaged by a latch 99 on a secondary lever 77; whereby the arms 95 are latched in raised positions against the tensions of their springs 96.

There are nine arms 95, the tenth arm being omitted and the ninth arm being cut off short as shown in Figure 8. Each of the eight arms has slidingly mounted thereon by a pin and slot connection, a stop plate 100, which is provided with a stop shoulder 101, the stops or stop shoulders being arranged in steps as shown in Figures 8 and 9. A spring 102 connects each stop plate with its arm and normally retains it in retracted position.

Arranged in the path of the shaft 41 is a yielding stop 103 which is mounted between a pair of arms 104 on a rock shaft 105, and spaced from this yielding stop 103 and arranged between the arms 104 is a fixed stop 106 which is formed on the cross-bar 107 connecting the side plates 12.

When a selector secondary key $s$ is depressed, it will move its connected latch 99 so as to release the corresponding arm 95, thereby permitting its spring 96 to move the corresponding stop 101 into the path of the shaft 41. During the last part of the movement of the arm 95 and after the stop is in the path of the shaft 41, the extension 98 will engage the cross bar 94 (lost motion being provided between the extension and the cross bar), thereby causing the spring 96, which is stronger than the spring 92, to overcome the latter and move the latches 91 out of engagement with the cross-bar 41 so as to release this cross-bar. The spring 45 connected with the selector carrier will now move the carrier to the right, Figure 8, into engagement with the stop 101. In view of the fact, however, that the stop plate 100 is movably mounted on its arm, the spring 45 will overcome the spring 102 and as the forward end of the stop plate is now opposite the yielding stop 103, the stop plate 100 will be carried forward carrying the yielding stop 103 with it, until the same is arrested by the fixed stop 106. The selectors will now be positioned in proper cooperative relation with the selected plungers and the selected compartment corresponding to the selected key and the selected stop 101.

The stop on the ninth arm 95 is omitted as heretofore described, as it is unnecessary. Accordingly, upon the depression of a ninth secondary key $s$, the cross-shaft 41 will be simply released and will strike against the yielding stop 103 moving the same until arrested by the fixed stop 106, thereby stopping the selectors in their ninth position. It is not necessary to provide an arm 95 or even release the shaft 41 for the secondary zero position, because that is the normal position of the selectors, as shown in Figure 8. Accordingly, the arm 95 can be omitted for the zero position.

Selector actuation.

Referring to Figures 2, 7 and 8, the rock shaft 105 has an arm 110 connected through a link 111 with the pawl 67. The connection between the arm 110 and the link 111 is a lost motion connection for a purpose hereinafter to be described. The pawl 67 has an arm 112 engaged by a spring 113 and the arm 110 has a connected arm 116 which is connected by a link 114 with the secondary zero lever 77.

Upon the depression of the secondary key as heretofore described, and after positioning of the selectors by arresting of the shaft 41 on the selector carrier by the stops 101, 103 and 106, for all of the keys except the zero key, the yielding stop 103 moves so as to rock the rock shaft 105. The rock shaft 105 will move the lever 110 up, Figure 2, thereby lifting the latch 67 and releasing the actuator bar 63, so as to cause the engagement of its lug 62 with the pin 61 on the bell crank lever 58—60, to raise the pair of positioned selectors S so as to raise the cooperating plungers and isolate and disaggregate the cards in a compartment as heretofore described. Upon depression of the zero secondary key, the link 114 will operate directly on the latch 67 so as to release the actuator bar to raise the selectors.

*Restoring mechanism.*

Referring to Figures 2 and 8, 120 designates an operating handle, the stub shaft of which is mounted in the right side plate 12, and which stub shaft has mounted thereon a crank 121 connected by a link with a cam 122 also mounted on the side plate. The cam 122 engages a bell-crank lever 123 mounted on the side plate, which lever is connected by a link 124 with the actuator bar 63, there being provided a pin and slot connection to provide for lost motion. The crank 121 is connected by a link 21X with a segment 125 fixed to the rock shaft 126 having a corresponding segment 125 on its other end. The segments 125 mesh with segments 127 fixed to a rock shaft 128 in the side plates 12. The segments 127 are provided with arms 129 connected by links 130 with the arms 43 a pin and slot connection being provided to allow for lost motion. The rock shaft 126 has arms 131 connected by links 132 to bell-crank levers 133 connected by a cross bar 134 adapted to engage extensions 135 on the arms 95. Arms 136 on the rock shaft 128 are connected through links 137 to the effectual bars 80, a pin and slot connection being provided to allow for lost motion. The rock shaft 126 or the segments 125 have lugs 138 engaging with stops 139 on the side plates 12.

When the crank arm 120 is moved back, it will operate through the connections heretofore described to restore all of the parts to normal positions. The action on the actuator bar 63 is through the cam and bell-crank connection, and it will be noted that the cam 122 has a quick action and thereafter is circumferential; this allows for the return of the actuator 63 and the dropping of the selectors before the other parts are actuated. The action on the selector carriers to return them is direct through the links 130, on the arms 43 and the links 42, while the action on the arms 95 is through the link 132, the cross bar 134 and the extensions 135. Accordingly, the selector carriers will be retracted while the arms 95 are being raised, thereby moving the extension 98 into engagement with its latch 99, and moving the cross bar 41 into engagement with its latches 91. The parts will, therefore, be restored to normal position, each part being latched under the tension of its spring.

*Résumé of operations.*

Assuming, for instance, that the auditor desires to inspect account Number 235; this account is in the second group and in the third division of that group; accordingly, the auditor will successively depress the primary key "2" and the secondary key "3". Upon depression of the primary key "2", the "2" effectual bar 80 will be released so as to cause the cam 82 thereon to cooperate with the bar 55 corresponding to the "2" selectors S and move the "2" pin 61 on the bell-crank lever 58—60 in the path of the "2" lug on the actuator bar 63, thereby rendering effective for cooperation the "2" selectors S so as to locate the "2" group of cards. Upon depression of the "3" secondary key, the "3" arm 95 will be released so as to position the "3" stop 101 thereon in the path of the shaft 41 and trip the latch 91 so as to release the shaft 41. Under the tension of the spring 45, the selector carrier moves forward carrying all of the selectors with it, until the shaft 41 is arrested, thereby positioning all of the selectors underneath the plungers for the "3" divisions or compartments of the different groups; but more particularly for the positioned effective or "2" group. During the latter part of the movement of the selector carrier and the shaft 41, and at a time when the selector has already partially alined with the "3" plungers, the rock shaft 105 is rocked by engagement of the stop plate 100 with the yielding stop 103, thereby causing the latch 67 to be raised to release the actuator bar 63 and cause the "2" lug thereon to engage with the pin 61 on the bell crank lever 58—60, and engage the cross-bar 55 with the heads of the "2" selectors so as to raise the same and lift the plungers in the "3" compartment and raise all of the cards therein as shown in Figure 11. This will expose the faces of all of the cards in that division or unit so that the identifying characteristics of all of the cards in the division or unit will be in full view, whereby card number "235" may be readily inspected or withdrawn for further inspection or for the making of an entry.

It will be noted that the division is left in raised position and is not dropped until the crank arm 120 has been pulled back. Accordingly, the card may be readily replaced as its position is indicated very plainly in the double space between the top edges of the "4" and "6" cards in that division. If, however, a number of cards have been withdrawn and the machine has been cleared each time, then in order to replace a given card, its number is set up on the key board, thereby isolating the division or unit containing that card and enabling the same to be readily replaced.

It is sometimes desirable to audit all of the cards; this can be readily accomplished in this machine and the procedure is as follows. All of the primary keys are depressed, thereby rendering all of the selectors effective for actuation. The auditor will then start by depressing the "1" secondary key; this will isolate and disaggregate all of the "1" divisions of the different groups and as these divisions are spaced ten divisions apart, the auditor can, by glancing over the isolated divisions, see whether a card is missing or has been misplaced. He will then clear the machine, again depress all of the primary keys, but now depress the "2" secondary key thereby isolating all of the "2" divisions. Similarly, the "3", "4", "5", "6", "7", "8", "9" and "0" divisions are similarly isolated. In this way, the entire system may be audited in a very short time, a missing card may be readily noted by its absence and may readily be found by the fact that there will be two cards in one of the divisions.

Conclusion.

It will, therefore, be seen that the invention accomplishes its objects. A simple and effective accounting apparatus and system is provided whereby a desired account may not only be found and replaced but whereby the accounts may be readily audited. The cards are simple in construction, and as they are arranged in groups and divisions, and since the selective characteristics of one division may be identical with those of all of the other divisions, the number of characteristics need not exceed the number of cards in a division. Accordingly, the numbers of different cards required to be kept in stock and the numbers of dies required for their production will be exceedingly small. The cards of a division or unit have selective characteristics of variant extents and more specifically of progressively variant extents corresponding to their positions in the division or unit.

The selection of a desired card is by successive eliminations and selections of a group, a division of the group and disaggregation of the division containing the account. The assembled division or unit containing the account is isolated and disaggregated upon such isolation. The disaggregation operates to relatively displace the located cards to different extents, in accordance with their positions in the unit or division, so as to expose the faces of all of the cards of the division and place them in overlapping relation, and this displacement proceeds successively during the isolation of a given located division or unit. Accordingly, the full division or unit is exposed for inspection or withdrawal or replacement of a desired card.

It is obvious that various changes may be made in the details of construction without departing from the spirit of this invention; it is, therefore, to be understood that this invention is not to be limited to the specific details shown and described.

Having thus described the invention, what is claimed is:

1. An accounting apparatus, comprising a tray, units of account cards therein, the cards of a unit being provided with differentiated characteristics, selecting means, means for controlling said selecting means adapted to locate a unit of assembled cards, and means for effecting cooperation of said selecting means with said characteristics in order to disaggregate the located unit of cards.

2. An accounting apparatus, comprising a tray, groups of account cards therein each divided into a plurality of units of cards, the cards of a unit being provided with differentiated characteristics, selecting means, means for controlling said selecting means adapted to locate a group and a unit in said group of cards, and means for effecting the cooperation of said selecting means with said characteristics in order to disaggregate the located unit of cards.

3. An accounting apparatus, comprising a tray, units of account cards therein, the cards of a unit being provided with differentiated characteristics, selecting means, means for controlling said selecting means adapted to locate a unit of assembled cards, and means for effecting the cooperation of said selecting means with said characteristics in order to expose portions of the faces of the cards in that located unit.

4. An accounting apparatus, comprising a tray, units of account cards therein, the cards of a unit being provided with differentiated characteristics, and a selector, means for locating said selector with reference to a unit of assembled cards, and means effecting cooperation of said selector with said characteristics in order to disaggregate the cards of the located unit.

5. An accounting apparatus, comprising a tray, units of account cards therein, the cards of a unit being provided with differentiated characteristics, and a selector having relation to a group of cards, means for locating said group by locating its selector, means for locating said selector with reference to a division of assembled cards in the located group, and means effecting cooperation of said selector with said characteristics in order to disaggregate the cards of the located division.

6. An accounting apparatus, comprising, a tray, account cards therein arranged in units and the cards of a unit being provided with differentiated characteristics, a selector, means for locating said selector with respect to a unit of cards, and means for engaging said selector with the characteristics of the located unit, adapted to disaggregate the cards of the located unit.

7. An accounting apparatus, comprising, a tray, account cards therein arranged in units and the cards of a unit being provided with vertically differentiated characteristics, a selector, means for locating said selector with respect to a unit of cards, and means for engaging said selector with the characteristics of the located unit, adapted to isolate the individual cards of the unit by successively displacing the cards of the located unit to successively increasing vertical heights.

8. An accounting apparatus, comprising, a tray, account cards therein arranged in units and the cards of a unit being provided with differentiated characteristics, a selector, means for locating said selector with respect to a unit of cards, and means for engaging said selector with the characteristics of the located unit, adapted to isolate the located unit and disaggregate the cards thereof.

9. An accounting apparatus, comprising, a tray, account cards therein arranged in units and the cards of a unit being provided with differentiated characteristics, a selector, means for locating said selector with respect to a unit of cards, and means for engaging said selector with the characteristics of the located unit, adapted to relatively displace the cards of the located unit.

10. An accounting apparatus, comprising, a tray, account cards therein arranged in units and the cards of a unit being provided with differentiated characteristics, a selector, means for locating said selector with respect to a unit of cards, and means for engaging said selector with the characteristics of the located unit, adapted to relatively displace the cards of the located unit so as to partially expose the faces thereof.

11. An accounting apparatus, comprising, a tray, cards arranged in units therein, the cards of a unit having characteristics varying according to their positions in the unit, a selector, means for locating said selector with respect to a unit of cards, and means for engaging said selector with the characteristics of the located unit, adapted to disaggregate the cards of the unit.

12. An accounting apparatus, comprising, a tray, cards arranged in units therein, the cards of a unit having characteristics varying according to their positions in the unit, a selector, means for locating said selector with respect to a unit of cards, and means for engaging said selector with the characteristics of the located unit, adapted to relatively displace the cards of the unit.

13. An accounting apparatus, comprising, a tray, cards arranged in units therein, the cards of a unit having characteristics varying according to their positions in the unit, a selector, means for locating said selector with respect to a unit of cards, and means for engaging said selector with respect to the characteristics of the located unit, adapted to relatively displace the cards of the unit so as to partially expose the faces thereof.

14. An accounting apparatus, comprising, a tray, cards arranged in units therein, the cards of a unit having characteristics varying according to their positions in the unit, a selector, means for locating said selector with respect to a unit of cards, and means for engaging said selector with the characteristics of the located unit, adapted to isolate the unit and disaggregate the cards thereof.

15. An accounting apparatus, comprising, a tray, cards arranged in units therein, the cards of a unit having characteristics of progressively varying extents, a selector, means for locating said selector with respect to a unit of cards, and means for engaging said selector with the characteristics of the located unit, in order to disaggregate the cards of the unit.

16. An accounting apparatus, comprising, a tray, cards arranged in units therein, the cards of a unit having characteristics of progressively varying extents, a selector, means for locating said selector with respect to a unit of cards, and means for engaging said selector with the characteristics of the located unit in order to relatively displace the cards of the unit.

17. An accounting apparatus, comprising, a tray, account cards therein arranged in units and the cards of a unit being provided with differentiated characteristics, a selector, means for locating said selector with respect to a group of cards, means for locating said selector with respect to a division of said group, and means for engaging said selector with the characteristics of the located division in order to disaggregate the cards of the located division.

18. An accounting apparatus, comprising, a tray, account cards therein arranged in units and the cards of a unit being provided with vertically differentiated characteristics, a selector, means for locating said selector with respect to a group of cards, means for locating said selector with respect to a division of said group, and means for engaging said selector with the characteristics of the located division in order to isolate the individual cards of the located division by moving the cards of the located division to successively higher vertical position.

19. An accounting apparatus, comprising, a tray, account cards therein arranged in units and the cards of a unit being provided with differentiated characteristics, a selector, means for locating said selector with respect to a group of cards, means for locating said selector with respect to a division of said group, and means for engaging said selector with the characteristics of the located division in order to isolate the located division and disaggregate the cards thereof.

20. An accounting apparatus, comprising, a tray, account cards therein arranged in units and the cards of a unit being provided with differentiated characteristics, a selector, means for locating said selector with respect to a group of cards, means for locating said selector with respect to a division of said group, and means for engaging said selector with the characteristics of the located division in order to relatively displace the cards thereof.

21. An accounting apparatus, comprising, a tray, account cards therein arranged in units and the cards of a unit being provided with differentiated characteristics, a selector, means for locating said selector with respect to a group of cards, means for locating said selector with respect to a division of said group, and means for engaging said selector with the characteristics of the located division in order to relatively displace the cards thereof so as to partially expose the faces thereof.

22. An accounting apparatus, comprising a tray, cards arranged therein in groups and divisions of the groups, the cards of a division having characteristics varying according to their positions therein, a selector, means for locating said selector with respect to a group of cards, means for locating said selector with respect to a division of said group, and means for engaging said selector with the characteristics of the located division in order to disaggregate the cards of said division.

23. An accounting apparatus, comprising a tray, cards arranged therein in groups and divisions of the groups, the cards of a division having characteristics varying according to their positions therein, a selector, means for locating said selector with respect to a group of cards, means for locating said selector with respect to a division of said group, and means for engaging said selector with the characteristics of the located division in order to relatively displace the cards of said division.

24. An accounting apparatus, comprising a tray, cards arranged therein in groups and divisions of the groups, the cards of a division having characteristics varying according to their positions therein, a selector, means for locating said selector with respect to a group of cards, means for locating said selector with respect to a division of said group, and means for engaging said selector with the characteristics of the located division in order to relatively displace the cards of said division so as to partially expose the faces thereof.

25. An accounting apparatus, comprising a tray, cards arranged therein in groups and divisions of the groups, the cards of a division having characteristics varying according to their positions therein, a selector, means for locating said selector with respect to a group of cards, means for locating said selector with respect to a division of said group, and means for engaging said selector with the characteristics of the located division in order to isolate said division and disaggregate the cards thereof.

26. An accounting apparatus, comprising a tray, cards arranged therein in groups and divisions of the groups, the cards of a division having characteristics of progressively varying extents, a selector, means for locating said selector with respect to a group of cards, means for locating said selector with respect to a division of said group, and means for engaging said selector with the characteristics of the located division in order to disaggregate the cards of said division.

27. An accounting apparatus, comprising a tray, cards arranged therein in groups and divisions of the groups, the cards of a division having characteristics of progressively varying extents, a selector, means for locating said selector with respect to a group of cards, means for locating said selector with respect to a division of said group, and means for engaging said selector with the characteristics of the located division in order to relatively displace the cards of said division.

28. In combination, a unit of cards of equal height and each having a portion for receiving a heading along one edge, the cards being provided with supporting or locating shoulders at a variety of distances from said heading, means movable to cooperate with said shoulders to bring the banked cards into stepped arrangement, and means for controlling and operating the last-named means.

29. In combination, a unit of cards of equal height, a tray for said cards, means operable to engage and support said cards, said cards and means being formed for cooperation to offset said cards successively in supported relation on said means, and manually controlled operating means for the last-named means.

In testimony whereof we affix our signatures this 21st day of October, 1919.

EDWIN L. RELLER.
JOHN H. BRUNINGA.